United States Patent [19]

Avery et al.

[11] Patent Number: 4,699,574

[45] Date of Patent: Oct. 13, 1987

[54] LOW HEAD, HIGH VOLUME PUMP APPARATUS AND METHOD

[76] Inventors: Don E. Avery, 45-437 Akimala St., Honolulu, Hi. 96744; Bryan F. Young, 66-489 Pikai St., Honolulu, Hi. 96712

[21] Appl. No.: 802,289

[22] Filed: Nov. 27, 1985

[51] Int. Cl.$^4$ .................. F04B 11/00; F16K 15/00
[52] U.S. Cl. ......................... 417/559; 417/565; 417/566; 92/171; 92/248; 137/527; 137/857
[58] Field of Search ............... 417/540, 566, 563, 565, 417/458, 567, 568; 137/527, 857; 92/171, 169, 248

[56] References Cited

U.S. PATENT DOCUMENTS

| | | | |
|---|---|---|---|
| 24,868 | 7/1859 | Hartzler | 417/565 X |
| 33,323 | 9/1861 | Van Camp | 417/458 |
| 65,435 | 6/1867 | Richter | 417/565 X |
| 85,063 | 12/1868 | Brown | 417/458 X |
| 98,734 | 1/1870 | Beers | 417/565 X |
| 308,509 | 11/1884 | McLeod | 417/565 X |
| 555,096 | 2/1896 | Hooker | 417/565 X |
| 1,346,293 | 7/1920 | Bernert | 406/56 |
| 3,236,190 | 2/1966 | Erickson | 417/568 X |
| 3,390,831 | 7/1968 | Eaton | 417/568 |
| 3,883,275 | 5/1975 | Browne | 417/568 X |
| 3,942,916 | 3/1976 | de Leeuw | 417/568 |
| 4,203,354 | 5/1980 | Cunningham | 92/248 X |
| 4,495,772 | 1/1985 | Furuta et al. | 92/171 X |
| 4,518,329 | 5/1985 | Weaver | 417/566 |

FOREIGN PATENT DOCUMENTS 754454 8/1956 United Kingdom ............... 417/565

Primary Examiner—Carlton R. Croyle
Assistant Examiner—Ted Olds
Attorney, Agent, or Firm—James C. Wray

[57] ABSTRACT

Two concentric vertical cylinders are separated by three radial partitions. An opening at the bottom of one of the partitions connects an air cell on one side of the partition with an outlet chamber on the other side of the partition. The two other partitions form sides of an inlet chamber, which receives fluid from outside the outer cylinder. The inner cylinder has a central pumping section positioned between upper and lower valve sections. In the valve sections ports extend through the inner cylinder wall to the inlet and outlet chambers. Spring loaded valves close the ports. Tension springs extend across the inlet chamber or compression springs extend across the inner cylinder to close the inlet valves. Tension springs extend across the inner cylinder to close the outlet valves. The elastomeric valve flaps have rigid curved backing members. A piston rod extends through one end cover to move a piston in the central section. An air tube extends between an upper end of the inner cylinder and the air cell, and check valves permit air to be trapped in the upper end of the cylinder and to flow to the cell.

14 Claims, 10 Drawing Figures

U.S. Patent  Oct. 13, 1987  Sheet 1 of 3  4,699,574
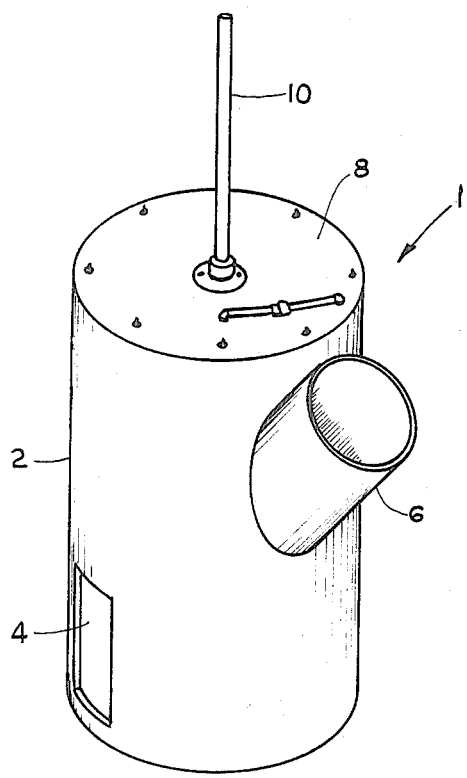
FIG. 1
FIG. 2
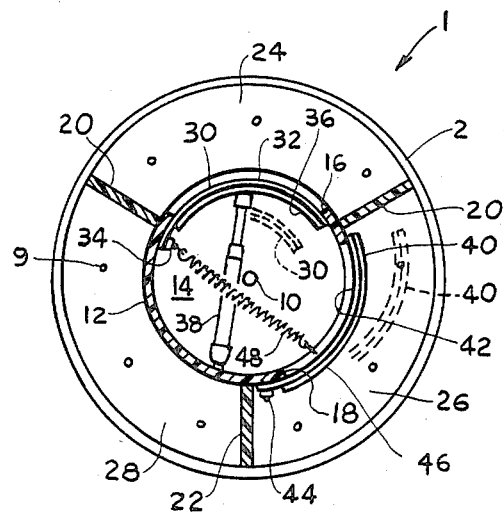
FIG. 3
FIG. 5

LOW HEAD, HIGH VOLUME PUMP APPARATUS AND METHOD

BACKGROUND OF THE INVENTION

Low head, high volume pumps are required in many instances, for example, the pumping of fluid from one level to another level such as the raising of water from one body of water such as from a reservoir to an irrigation canal or from reservoir to reservoir or from canal to canal.

There are several desired attributes of such pumps, simplicity, reliability, economy of operation, economy of construction high efficiency over a wide range of flow rates and the possibility of constructing high volume pumps using readily available materials and tools.

The present invention provides a pump which can be easily and quickly made using readily available tools and materials and which when made, operates with high reliability and which requires little and infrequent maintenance.

SUMMARY OF THE INVENTION

Two concentric vertical cylinders are separated by three radial partitions. An opening at the bottom of one of the partitions connects an air cell on one side of the partition with an outlet chamber on the other side of the partition. The two other partitions form sides of an inlet chamber, which fills with water from outside the outer cylinder. The inner cylinder has a central pumping section positioned between upper and lower valve sections. In the valve sections ports extend through the inner cylinder wall to the inlet and outlet chambers. Spring loaded valves close the ports. Tension springs extend across the inlet chamber or compression springs extend across the inner cylinder to close the inlet valves. Tension springs extend across the inner cylinder to close the outlet valves. The elastomeric valve flaps have rigid curved backing members. A piston rod extends through one end cover to move a piston in the central section. An air tube extends between an upper end of the inner cylinder and the air cell, and check valves permit air trapped in the upper end of the cylinder to flow to the cell.

As a piston is driven up and down, the large flap valves automatically open against spring pressure, drawing fluid in from the pie-shaped inlet chamber and forcing fluid out to the outlet chamber, from which flow is smoothed by the air cell. Air trapped in the upper end of the inner cylinder is automatically transferred with each stroke to the air cell.

In one method of manufacture, a stainless steel sheet is bent, with straps, around wooden disks, and the edges of the sheet are tack welded together to form a cylinder. Temporary sheet metal cylinders, held in shape by internal discs, are added at ends of the stainless steel cylinder. The three cylinders are held in place by a strong pipe passing thru holes in the center of all discs. Inlet valve ports are secured to the temporary cylinders, and the structure is wrapped with fiberglass, or similar material. Before it sets, outlet valve ports are added about 120 degrees from the inlet valve ports. Radial strips are added to separate inlet and outlet and air cell chambers. Hinges are achieved by bolting strips along edges of the the ports to hold the flap valves. An outer cylinder is formed in a way similar to the inner cylinder and is slid axially along the radially extending strips and is secured in place. A piston is placed within the stainless steel cylinder. Valve springs are added and end covers are secured, readying the pump for operation.

A preferred low head, high volume pump has two vertical concentric cylinders. Three vertical partitions between the cylinders divide a space between the cylinders into an outlet chamber, an inlet chamber and an air cell. A lower portion of the air cell opens into the outlet chamber. Upper and lower inlet ports open between the inlet chamber and the inner cylinder, and upper and lower outlet ports open between the outlet chamber and the inner cylinder. Spring loaded valves in the ports permit flow from the inlet chamber to the cylinder and from the cylinder to the outlet chamber. A piston reciprocates in the inner cylinder. Upper and lower end covers complete the cylinders. A piston rod connected to the piston extends through one of the covers. An inlet is connected to the inlet chamber and an outlet is connected to the outlet chamber.

The preferred low head, high volume pump valves have springs which extend through the inner cylinder, the springs on the valves at the inlet ports being compression springs and the springs on the valves at the outlet ports being tension springs.

Preferably the valves are curved hinged flap valves, with hinges at vertical edges thereof connected to a wall of the inner cylinder adjacent the ports.

The flap valves at the inlet ports are mounted on an inside of the inner cylinder, and the flap valves on the outlet ports are mounted on an outer side of the inner cylinder.

The preferred flap valve comprises a curved sheet of elastomeric material for contacting a surface of the inner cylinder surrounding a port and a complementary rigid reinforcing sheet curved similarly to a wall of the inner cylinder. The springs are connected to the rigid reinforcing sheet.

Preferably the inner cylinder is divided axially into three sections, an upper valve section, a lower valve section and a middle piston-receiving section.

Preferably the middle section has an inner cylinder liner. The preferred cylinder liner is replaceable stainless steel. Preferably, the inner and outer cylinders are made of fiberglass.

A preferred piston comprises a flat round fiberglass disk having a central portion and an lower portion extending radially outward beyond the central portion. Elastomeric rings are mounted outwardly on the lower portion. A ring compressor comprising a fiberglass annulus has a lower extending radial flange for bearing against the rings. Connectors urge the ring compressor downward toward the lower portion.

The invention is described with reference to specific embodiments. Other embodiments may be constructed within the scope of the invention. For example, the large flaps may be hinged horizontally to the ports. Springs may extend across the chambers rather than across the inner cylinder, or some of the springs may extend across the chambers and some may extend across the inner cylinder.

As an example, the inlet valve springs may be tension springs connected between the outer cylinder and the inlet valves, or the outlet valve springs may be compression springs connected between the outer cylinder and the outlet valve.

Simplified or large scale production changes may be made. For example, the pump may be constructed of preformed cylinders and linings or cylinders and partitions maybe formed all in one piece. A tubular stainless steel lining may be chilled and inserted in a heated and expanded fiberglass tube, whereby normalization of temperatures permanently connects the lining to the inner cylinder. The outer cylinder may be formed such as by pressing inward in the areas between the partitions to expand the areas at the partitions outward while the cylinders are assembled.

While a cylinder lining is preferred, the pump may operate without a lining. While port linings are preferred, the pump operates satisfactorily without port linings.

While two springs are preferred for each valve, the valves also operate with single springs. Other valve forms may be used. The present valves are preferred since they provide reliable and efficient operation. Valves may be used with or without backings. Curved backings may be cut from preformed tubes or may be formed around forms as desired. Pistons and end plates use preformed shapes or they may be constructed with fiberglass between flat plates. Balsa or other reinforcements for strength and lightness may be employed in the fiberglass structures.

While the invention is described with reference to specific embodiments and variations of the embodiments, other variations within the scope of the invention are apparent in the disclosure which includes the above and ongoing descriptive material and claims which constitute the specification and the drawings.

BRIEF DESCRIPTION OF THE DRAWINGS

FIG. 1 is a perspective view of the pump of the present invention.

FIG. 2 is a cross-sectional view through upper valves of the pump.

FIG. 3 is a lower end view of the pump shown in FIG. 1.

FIG. 5 is a detail of a compression spring assembly.

DESRIPTION OF THE PREFERRED EMBODIMENT

Figure 4:
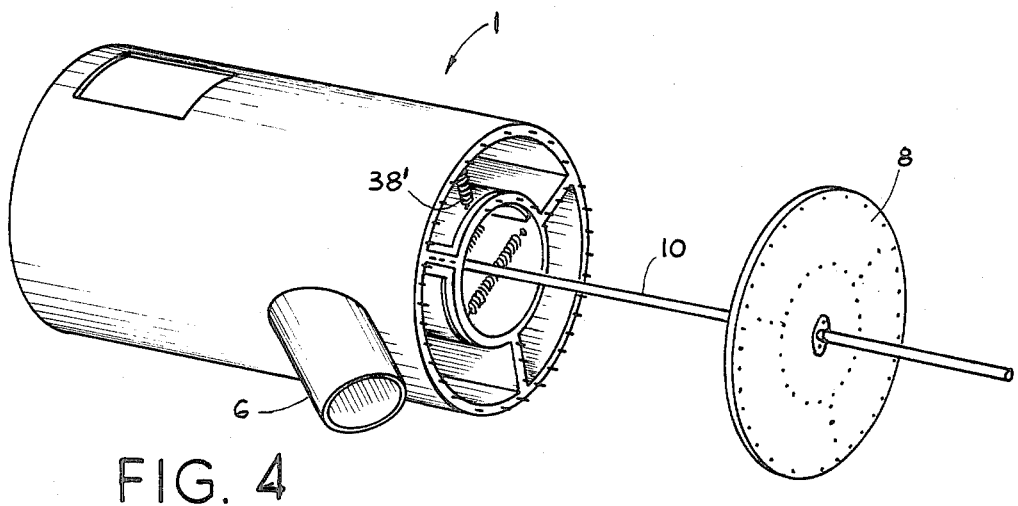
FIG. 4 is an upper end view showing a tension spring used for inlet valves.

Referring to the drawings, a pump of the present invention is generally indicated by the numeral 1. Outer cylinder 2 has an inlet opening 4 and an outlet 6. Upper cover 8 has a packing box through which piston rod 10 slides.

In the partial cross section shown in FIG. 2, it can be seen that the pump 1 is made of an outer cylinder 2 and an inner cylinder 12 which are separated by longitudinally extending radially oriented strips 20 and 22. A piston 14 is connected to piston rod 10 for upward and downward movement in a central portion of the inner cylinder 12. Inlet ports 16 are formed in upper and lower portions of the wall of inner cylinder 12. Upper and lower outlet ports 18 are also formed in the wall.

The inner and outer cylinders 2 and 12 are concentric and are coterminal. Strips 20 extend from the top to the bottom of the cylinders, and strip 22 extends from the top downward to a position spaced from the bottom. The radial strips divide the space between the inner and outer cylinders into an inlet chamber 24, an outlet chamber 26 and an air cell 28. Valves 30, at the upper and lower ends of the inner chamber, communicate the inside of the inner cylinder 12 with the inlet chamber 24. Valves 40, at upper and lower ends of the inner cylinder 12, communicate the cylinder with the outlet chamber 26, as piston 14 rises and falls. Valve 30 has an elastomeric sheet 32 which lies against the inside wall of the cylinder 12 along inlet port 16 to selectively close the inlet port. A portion of the elastomeric sheet 32 extends laterally beyond the port where it is joined to the inner wall of the inner cylinder 12. A rigid hinge backing strip 34 which may be made out of fiberglass, receives fasteners which extend through the backing strip, the elastomeric sheet and the wall. A rigid curved backing member 36 supports the elastomeric sheet 32 in the area of the port 16. A compression spring schematically represented by the numeral 38 is mounted between the inner wall of the cylinder and the inner surface of the backing strip 36 to urge the valve to its closed position. As piston 14 is moved downward, reduced pressure above the piston causes the valve 30 to open as shown in phantom lines to fill the chamber above the piston.

Outlet valve 40 opens as the piston 14 moves upward to expel water through port 18. The outlet valve 40 has an elastomeric sheet 42, a mounting strip 44 and a curved rigid backing sheet 46. A tension spring 48 urges the outlet valve 40 to its closed position.

As shown in FIG. 2, nine through bolts 9 extend between the covers and hold the end covers 7 and 8 together, completing the pump.

The lower end of the pump is shown in FIG. 3. It can be seen that the strips, partitions or dividers 20 are coextensive with the outer cylinder 2 and the inner cylinder 12. Divider 22 stops short of the lower end, leaving an opening 23 through which fluid may move between the air cell and the outlet chamber to smooth flow from the outlet chamber. As shown in the drawings, parallel compression spring assemblies 38 or tension springs, hold the inlet valves 30 closed. Parallel tension springs hold the outlet valves 40 closed.

As shown in FIG. 4, when there is sufficient space between the inner and outer tubes, tension springs 38' may be substituted for the compression springs 38 to hold the inlet valves outward in the closed position.

FIG. 5 shows details of the compression spring assemblies 38. Sleeve 50 with end cap 52 receives a sliding mandrel 54 with an end cap 56. Spring 58 is mounted on the mandrel 54 and the spring and the mandrel freely reciprocate within housing 50. End caps 52 press against the cylinder wall and end caps 56 press against the rigid backing of valve 30. Fixed pins, thru holes in the caps hold assembly 38 in place.

Figure 6:
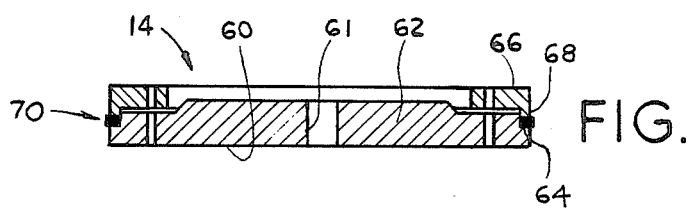
FIG. 6 is a detail of a piston assembly.

A preferred piston 14 is shown in FIG. 6. Piston 14 has the body 60 with an opening 61 for receiving one end of the piston rod. An enlarged central portion 62 provides strength to the piston body 60. The outer peripheral surface has a recess 64. A ring compressor 66 has a lip 68 which fits into the recess to hold and compress an elastomeric ring 70 therein.

Figure 7:
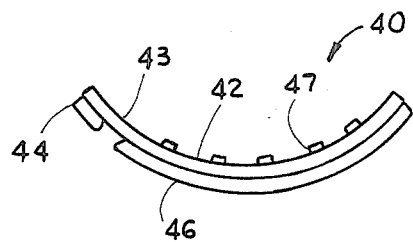
FIG. 7 is a detail of an outlet valve.

A detail of the manufacture of one of the valves is shown in FIG. 7. All valves may be constructed in a similar manner. In the example, the output valve 40 has an elastomeric sheet 42. Sheet 42 may be made of reinforced rubber or neoprene. A section 43 of sheet 42 provides a hinge. A fiberglass backing strip 44 extends along one vertical edge of the strip to support fasteners extending through the backing strip 44, the sheet 42 and the wall of the cylinder adjacent the port. A curved fiberglass backing member 46 extends over a substantial portion of the sheet 42. Plural narrow vertical fiberglass strips 47 fit within the port on the opposite side of the sealing sheet 42. Fasteners extend through the reinforcing strips 47, flexible sheet 42, and backing 46 to maintain the curved shape of the flap valve during operation.

Figure 8:
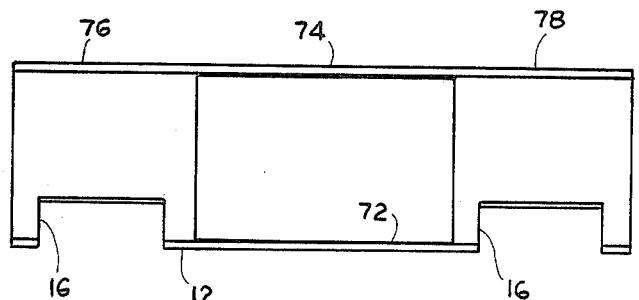
FIG. 8 is a detail of an inner cylinder.

As shown in FIG. 8, the inner cylinder 12 has a stainless steel liner 72 in its middle portion 74. The maximum stroke of the piston is slightly inward from the opposite ends of the stainless steel liner.

Opposite ends of the inner cylinder 12 form valve chambers 76 and 78 which have valve ports 16 and 18 (not shown in FIG. 8).

Figure 9:
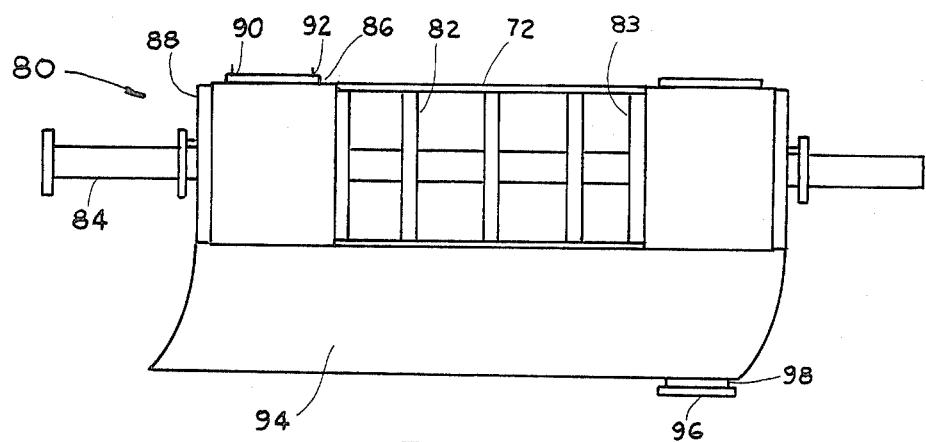
FIG. 9 is a schematic view of a method of constructing the inner cylinder.

In one method of construction, the inner cylinder 12 is formed as shown in FIG. 9. Thin wood discs 82 and two thick wood disks 83 are mounted on a support pipe 84. A stainless steel liner 72 is formed by bending flat flexible sheets around the disks 82 and half of 83 by holding the sheets in bent form with straps while adjacent longitudinal edges are tack welded. Thin temporary sheet metal cylinders 86 are supported on the thin wooden disks and ½ of the thick wood discs 83 (not shown) at opposite ends of the liner 72 and wooden disks 88 are added at the opposite ends and are wedged into place, holding the assembly together. Curved inlet valve sheets 90 with generally rectangular openings are temporarily fastened in place on the temporary end cylinders 86. Screws 92 project outwardly to become embedded in the fiberglass mat 94 which is wrapped around the assembly. Before the resin in the fiberglass sheet sets, outlet ports 96 with screws 98 are pressed onto the assembly and are held by a jig. After the fiberglass sets, supporting ends of the pipe 84 are fixed in the axial direction and while turning the assembly as in a lathe, the ends of the cylinder are cut and squared with a powered abrasive disc. The temporary cylinders and all wood discs except the ones inside the cylinder liner 82 are removed, and four valve openings are cut in the cylinder wall. The fiberglass divider strips are added to the outside of the wall and are bonded or bonded and screwed in place. The valve hinge strips 44 are screwed onto the cylinder wall adjacent to the valve openings. An outer cylinder is made in a similar manner and is slid over the divider strips. Holding true flat surfaces against the ends of the cylinders, the outer cylinder is bonded or is bonded and screwed to the divider strips. The support pipe and wooden disks are pulled from the stainless steel liner, and the piston and piston rod are inserted. The valve springs are installed and the end covers are placed in position and are secured with thru bolts which extend through the length of the pump readying the pump for operation.

Figure 10:
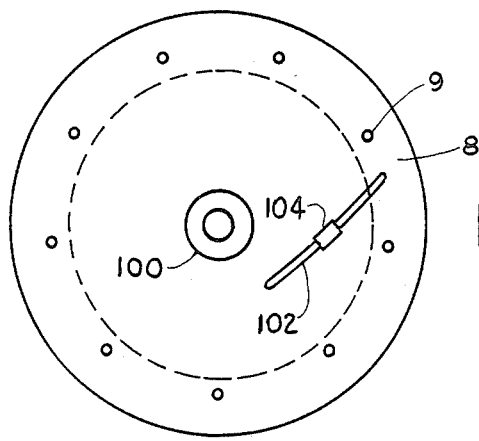
FIG. 10 is a detail of the top cover showing the packing box, air tube and check valve for permitting air to flow from the upper end of the inner cylinder to the air chamber.

As shown in FIG. 10, a packing box 100 is connected to the cover 8. Air tube 102 extends between the upper portion of the inner cylinder and the air cell. Check valve 104 in tube 102 permits flow of air from the inner cylinder to the air cell, serving the double function of removing trapped gas from the cylinder while maintaining the air cell pressurized. Additional partitions may be added for support as needed.

In a basic form, the pump consists of two vertical cylinders and three vertical partitions between the cylinders, two inlet ports and two outlets ports, each with a spring loaded valve, a piston with a rod and a packing box on a top cover, a bottom cover and an inlet and outlet. The partions separate the inner space between the cylinders to form an inlet chamber, an outlet chamber and an air cell. An additional check valve and controlled orifice may be added to control the amount air entering the top of the inner cylinder. The air cell and the outlet chamber communicate near the bottom cover. Flap valves on the ports open and close as the piston reciprocates within a stainless steel liner in the center of the inner cylinder. Any air trapped within the inner cylinder is compressed upon an inward stroke of the piston and flows through a check valve to the top of the air cell.

The inlet can be anywhere in the inlet chamber as long as it remains far enough below the water line so that air will not be sucked in or a suction pipe pay be used with the entire pump above water. The outlet can be anywhere on the side of the outlet chamber or on the top of the chamber.

While the invention has been described with reference to specific embodiments, modifications and variations of the invention can be constructed and methods may be used without departing from the scope of the invention. The scope of the invention is defined in the following claims.

I claim:

1. A low head, high volume pump comprising two vertical concentric and coaxial cylinders, three vertical partitions between the cylinders, dividing a space between the cylinders into an outlet chamber, an inlet chamber and an air cell, a lower portion of the air cell opening into the outlet chamber, upper and lower inlet ports between the inlet chamber and the inner cylinder and upper and lower outlet ports between the outlet chamber and the inner cylinder, spring loaded valves in the ports for permitting flow from the inlet chamber to the cylinder and for permitting flow from the cylinder to the outlet chamber, a piston in the inner cylinder, upper and lower end chambers on the cylinders, a piston rod connected to the piston and extending through one of the covers, an inlet connected to the inlet chamber and an outlet connected to the outlet chamber, wherein the spring loaded valves have springs which extend through the inner cylinder, the springs on the valves at the inlet ports being compression springs and the springs on the valves at the outlet ports being tension springs.

2. The apparatus of claim 1 wherein the valves are curved hinged flap valves with hinges at vertical edges thereof connected to a wall of the inner cylinder adjacent the ports.

3. The apparatus of claim 2 wherein the flap valves at the inlet ports are mounted on an inside of the inner cylinder and wherein the flaps valves on the outlet ports are mounted on an outer side of the inner cylinder.

4. The apparatus of claim 3 wherein the flap valves comprise a curved sheet of elastomeric material for contacting a surface of the inner cylinder surrounding a port and a complimentary rigid reinforcing sheet curved similarly to a wall of the inner cylinder and wherein the springs are connected to the rigid reinforcing sheet.

5. The apparatus of claim 1 wherein the inner cylinder is divided axially into three sections, an upper valve section, a lower valve section and a middle piston receiving section.

6. The apparatus of claim 5 wherein the middle section has an inner cylinder liner.

7. The apparatus of claim 6 wherein the cylinder liner is stainless steel.

8. The apparatus of claim 7 wherein the inner and outer cylinders are made of fiberglass or similar material.

9. The apparatus of claim 1 wherein the piston comprises a flat round fiberglass support having a central portion and an lower portion extending radially outward beyond the central portion, elastomeric ring means mounted outwardly on the outer section and a ring compressor comprising a fiberglass annulus having a downward extending radial flange for bearing against the ring means and means for urging the ring compressor downward toward the outer portion.

10. The apparatus of claim 1 wherein the valves comprise a curved elastomeric sheet, an axially extending rigid hinge portion extending along one axial edge of the elastomeric sheet, a curved rigid backing portion spaced from the hinge portion and extending over a remainder of the elastomeric sheet.

11. The apparatus of claim 10 further comprising axially extending fiberglass reinforcing strips on a side of the elastomeric sheet opposite the rigid backing and means for joining the strips and the rigid backing for maintaining the shape of the elastomeric element.

12. The apparatus of claim 1 wherein the inlet is disposed at a lower portion of the inlet chamber and the outlet is disposed at an upper portion of the outlet chamber.

13. The apparatus of claim 1 wherein the inlet and outlet chambers and the air cell are radially disposed around the inner cylinder.

14. A low head, high volume pump comprising two vertical concentric and coaxial cylinders, three vertical partitions between the cylinders, dividing a space between the cylinders into an outlet chamber, an inlet chamber and an air cell, a lower portion of the air cell opening into the outlet chamber, upper and lower inlet ports between the inlet chamber and the inner cylinder and upper and lower outlet ports between the outlet chamber and the inner cylinder, spring loaded valves in the ports for permitting flow from the inlet chamber to the cylinder and for permitting flow from the cylinder to the outlet chamber, a piston in the inner cylinder, upper and lower end chambers on the cylinders, a piston rod connected to the piston and extending through one of the covers, an inlet connected to the inlet chamber and an outlet connected to the outlet chamber, wherein the spring loaded valves have springs which extend through the inner cylinder, the springs on the valves at the inlet ports being tension springs and the springs on the valves at the outlet ports being tension springs.

* * * * *